US010420061B2

(12) United States Patent
Huang

(10) Patent No.: US 10,420,061 B2
(45) Date of Patent: Sep. 17, 2019

(54) GEOGRAPHIC LOCATION POSITIONING METHOD AND APPARATUS

(71) Applicants: Beijing Kingsoft Office Software, Inc., Beijing (CN); Zhuhai Kingsoft Office Software Co., Ltd., Guangdong (CN); Guangzhou Kingsoft Mobile Technology Co., Ltd., Guangdong (CN)

(72) Inventor: Chuantong Huang, Guangdong (CN)

(73) Assignees: Beijing Kingsoft Office Software, Inc., Beijing (CN); Zhuhai Kingsoft Office Software Co., Ltd., Guangdong (CN); Guangzhou Kingsoft Mobile Technology Co., Ltd., Guangdong (CN)

( * ) Notice: Subject to any disclaimer, the term of this patent is extended or adjusted under 35 U.S.C. 154(b) by 0 days.

(21) Appl. No.: 16/066,370

(22) PCT Filed: Dec. 20, 2016

(86) PCT No.: PCT/CN2016/111122
§ 371 (c)(1),
(2) Date: Jun. 27, 2018

(87) PCT Pub. No.: WO2017/114242
PCT Pub. Date: Jul. 6, 2017

(65) Prior Publication Data
US 2019/0021067 A1    Jan. 17, 2019

(30) Foreign Application Priority Data
Dec. 31, 2015 (CN) .......................... 2015 1 1033676

(51) Int. Cl.
H04W 64/00 (2009.01)
H04W 8/02 (2009.01)
(Continued)

(52) U.S. Cl.
CPC ......... *H04W 64/003* (2013.01); *G01S 5/0036* (2013.01); *G01S 5/0072* (2013.01);
(Continued)

(58) Field of Classification Search
CPC ..... H04W 64/003; H04W 8/02; G01S 5/0036; G01S 5/0072; H04L 61/609; H04L 61/1588
See application file for complete search history.

(56) References Cited

U.S. PATENT DOCUMENTS 9,026,145 B1 *  5/2015  Duleba ................... H04L 61/25
                                                    455/456.3
2014/0074820 A1 *  3/2014  Murphy ............. G06Q 30/0256
                                                    707/722

FOREIGN PATENT DOCUMENTS

CN    101374249 A    2/2009
CN    103220376 A    7/2013
(Continued)

OTHER PUBLICATIONS

International Search Report and Written Opinion for Application No. PCT/CN2016/111122 dated Mar. 1, 2017, 6 pages.
(Continued)

*Primary Examiner* — Muthuswamy G Manoharan
(74) *Attorney, Agent, or Firm* — Alston & Bird LLP

(57) ABSTRACT

The embodiments of the present application provide a method and an apparatus for geographic location positioning. The method includes: first obtaining a target IP address of a target terminal device; then determining a plurality of geographic areas where the target IP address presents; determining at least one piece of real-time data corresponding to the target IP address from the database, wherein the real-time data includes a target geographic location where the target IP address presents within a predetermined period; determining a target geographic area currently correspond-
(Continued)

ing to the target IP address from the plurality of geographic areas based on the target geographic location included in the real-time data; finally determining location information corresponding to the target terminal device based on the target geographic area. It can accurately locate a terminal device without depending on a positioning module of the terminal device itself by means of the solution.

14 Claims, 4 Drawing Sheets

(51) Int. Cl.
*H04L 29/08* (2006.01)
*H04L 29/12* (2006.01)
*G01S 5/00* (2006.01)

(52) U.S. Cl.
CPC .......... *H04L 29/08* (2013.01); *H04L 61/1588* (2013.01); *H04W 8/02* (2013.01); *H04L 61/609* (2013.01)

(56) References Cited

FOREIGN PATENT DOCUMENTS

| | | |
|---|---|---|
| CN | 104333609 A | 2/2015 |
| CN | 105100292 A | 11/2015 |
| CN | 103248723 A | 8/2018 |
| WO | WO 2012/049398 | 4/2012 |

OTHER PUBLICATIONS

Office Action for Chinese Application No. 201511033676.1 dated Apr. 30, 2019.

* cited by examiner

GEOGRAPHIC LOCATION POSITIONING METHOD AND APPARATUS

The present application claims the priority to a Chinese Patent Application No. 201511033676.1, filed with the State Intellectual Property Office of the People's Republic of China on Dec. 31, 2015 and entitled "GEOGRAPHIC LOCATION POSITIONING METHOD AND APPARATUS", which is incorporated herein by reference in its entirety.

TECHNICAL FIELD

The present application relates to the field of data processing technologies, and in particular, to a method and apparatus for geographic location positioning.

BACKGROUND

With the rapid development of science and technology, terminal devices with positioning modules (such as Global Positioning System (GPS) modules) are becoming more and more common. However, there are still a large number of terminal devices without positioning modules, such as traditional PC (Personal computer) devices, and these terminal devices without positioning modules also have very high positioning requirements in some scenarios.

In the prior art, for these terminal devices without positioning modules, the GIS (Geographic Information System) geographic location service can be translated based on the IP (Internet Protocol Address) address provided on the network to complete positioning. However, the existing public network IP address is a fixed pre-assigned IP address by the CNNIC (China Internet Network Information Center) by geographic area and the operator, which has a rough regionality. Even if the service of translating IP address into GIS geographic location combined with manual intervention correction, but the accuracy of the correction is only based on the municipal or county level, the general accuracy is in the range of 1 to 10 kilometers, and it is difficult to achieve accurate positioning requirements.

It can be seen that how to accurately position a terminal device without depending on a positioning module of the terminal device itself is a problem that needs to be solved urgently. By means of accurately positioning a terminal device without depending on a positioning module of the terminal device itself, it can not only provide another method of determining the location for an electronic device with a positioning module, but also solves a problem of determining the location of an electronic device without a positioning module.

SUMMARY

The embodiments of the present application disclose a method and an apparatus for geographic location positioning, so as to accurately position a terminal device without depending on a positioning module of the terminal device itself The technical solution is as follows:

In a first aspect, an embodiment of the present application provides a method for geographic location positioning, which is applicable in a server, the server pre-stores a database including at least a correspondence between an IP address and a geographic location where the IP address presents, wherein the geographic location where the IP address presents is obtained from a plurality of terminal devices configured with a positioning module by themselves; the method includes:

obtaining a target IP address of a target terminal device;

determining a plurality of geographic areas where the target IP address presents based on the database, wherein, any geographic area is determined by a plurality of geographic locations where the target IP address presents;

determining at least one piece of real-time data corresponding to the target IP address from the database, wherein the real-time data includes a target geographic location where the target IP address presents within a predetermined period;

determining a target geographic area currently corresponding to the target IP address from the plurality of geographic areas based on the target geographic location included in the real-time data;

determining location information corresponding to the target terminal device based on the target geographic area.

In a second aspect, an embodiment of the present application further provides an apparatus for geographic location positioning, which is applicable in a server, the server pre-stores a database including at least a correspondence between an IP address and a geographic location where the IP address presents, wherein the geographic location where the IP address presents is obtained from a plurality of terminal devices configured with a positioning module by themselves; the apparatus includes:

a target IP address obtaining module, configured for obtaining a target IP address of a target terminal device;

a geographic area determining module, configured for determining a plurality of geographic areas where the target IP address presents based on the database, wherein, any geographic area is determined by a plurality of geographic locations where the target IP address presents;

a real-time data determining module, configured for determining at least one piece of real-time data corresponding to the target IP address from the database, wherein the real-time data includes a target geographic location where the target IP address presents within a predetermined period;

a target geographic area determining module, configured for determining a target geographic area currently corresponding to the target IP address from the plurality of geographic areas based on the target geographic location included in the real-time data;

a location information determining module, configured for determining location information corresponding to the target terminal device based on the target geographic area.

In a third aspect, the present application further provides an electronic device, comprising: a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the electronic device; the memory is configured to store an executable program code; the processor executes the program corresponding to the executable program code by reading the executable program code stored in the memory for performing the method for geographic location positioning provided in the embodiment of the present application.

In a fourth aspect, an embodiment of the present application provides an application program, the application program is used to perform the method for geographic location positioning provided in the embodiment of the present application when being executed.

In a fifth aspect, an embodiment of the present application provides a storage medium, wherein the storage medium is used to store executable program code, and the executable program code is used to perform the method for geographic location positioning provided in the embodiment of the present application when being executed.

The method and apparatus for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

BRIEF DESCRIPTION OF THE DRAWINGS

In order to describe the technical solutions of embodiments of the present application and of the prior art more clearly, a simple introduction of the drawings required in the description of the embodiments and of the prior art will be given. Obviously, the drawings described below are just for some embodiments of the present application and other drawings may be obtained by those of ordinary skills in the art based on these drawings without any creative effort.

DETAILED DESCRIPTION

Figure 1:
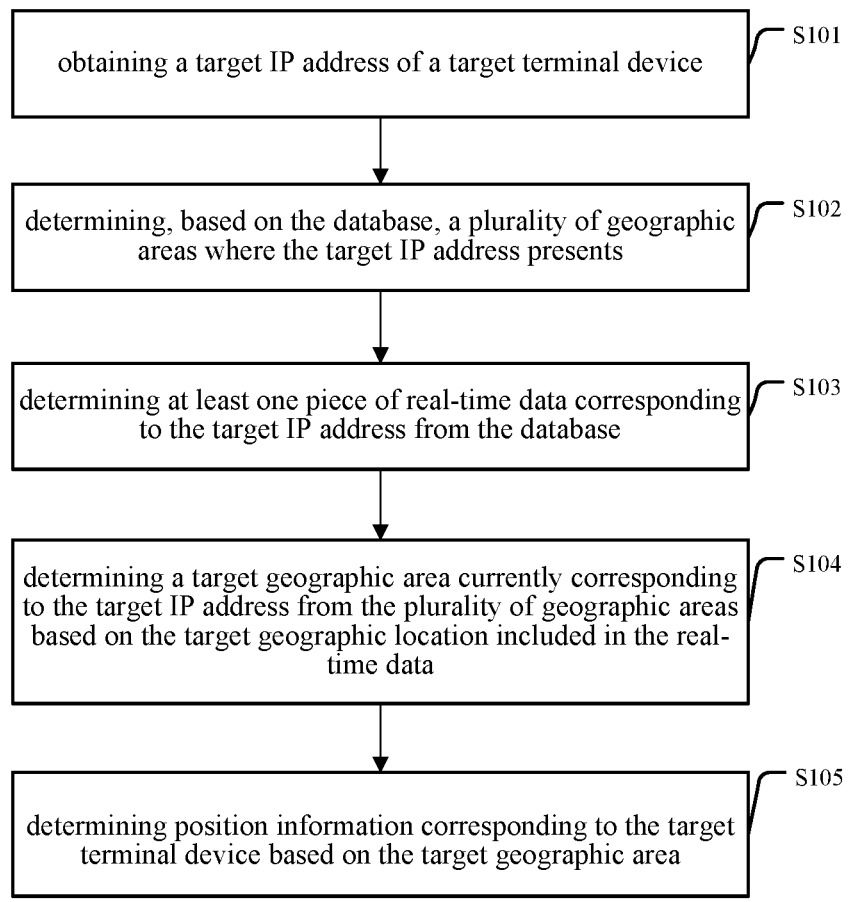
FIG. 1 is a flowchart of a method for geographic location positioning according to an embodiment of the present application.

The embodiments of the present application will now be described in conjunction with the accompanying drawings in the embodiments of the present application, and it will be apparent that the described embodiments are only part of the embodiments of the present application and not all of the embodiments. Based on the embodiments of the present application, all other embodiments obtained by those of ordinary skill in the art without making creative work are within the scope of this application.

In order to accurately position a terminal device without depending on a positioning module of the terminal device, the embodiments of the present application disclose a method and an apparatus for geographic location positioning.

First, a method for geographic location positioning according to an embodiment of the present application will be described below.

It should be noted that the method for geographic location positioning according to the embodiment of the present application may be implemented in a server.

It should be noted that the server pre-stores a database containing at least a correspondence between an IP address (Internet Protocol Address) and a geographic location where the IP address presents, wherein the geographic location where the IP address presents is obtained from a plurality of terminal devices configured with a positioning module; that is, a geographic location where the above IP address presents is provided by one terminal device correspondingly, one IP address corresponds to a plurality of geographic locations where the IP address presents, and the database contains information of a plurality of IP addresses.

In the above database, the corresponding information of the IP address is stored. It should be emphasized that a large number of IP addresses are stored in the database, and the corresponding information refers to the information of the geographic location where the corresponding IP address once presented. It should be pointed out that the "once" mentioned here refers to a certain time period in the past. For example, in the embodiment of the present application, the time period may be set to the past 24 hours. The set time period should not be too short; otherwise, it would result in too little information in the database, which would not facilitate the searching for data subsequently.

In addition, information of each geographic location is sent to the server by a terminal device that has its own positioning module. The positioning module described here can be a Global Positioning System (GPS) positioning module, and the positioning accuracy of the GPS positioning module can be 10 to 100 meters, so that the positioning of the following target terminal devices can also be more accurate. Of course, the positioning module can also be other modules that can achieve accurate positioning, and is not limited to the GPS positioning module.

It should be noted that obtaining geographic location information from a terminal device requires the terminal to authorize. For example, it may be that the terminal device has an APP installed, and the user of the terminal device authorizes the server in the APP to obtain the positioning information (i.e., information of the geographic location) that can be acquired by the positioning module of the terminal device. Wherein, APP is an abbreviation of Application, and APP refers to a third-party application of a smart phone.

The triggering method for the terminal device to report the information of the geographic location to the server includes: reporting the information of the geographic location once when the terminal device authorizes for the first time; periodically reporting geographic location information at regular intervals; reporting the information of the geographic location once when the terminal device re-accesses the WiFi; reporting the information of the geographic location once when the IP address of the terminal device changes, and the terminal device reports the geographic location information directly and actively. Obviously, the triggering manner for the terminal device to report the information of its geographic location is various and will not be described here.

Based on the foregoing database pre-stored by the server, as shown in FIG. 1, a process for implementing the method for geographic location positioning provided in an embodiment of the present application may include:

S101: obtaining a target IP address of a target terminal device;

It should be noted that the server does not have to actively obtain the target IP address, but can also manually input a target IP address manually. For example, when the police investigates a case, it is necessary to search for the geographic location information of a target IP, and then a target IP address can be directly input to the server, thereby applying the embodiment of the present application to find the geographic location of the target terminal device. Of course, it is not limited to this.

S102: determining, based on the database, a plurality of geographic areas where the target IP address presents.

Figure 5:
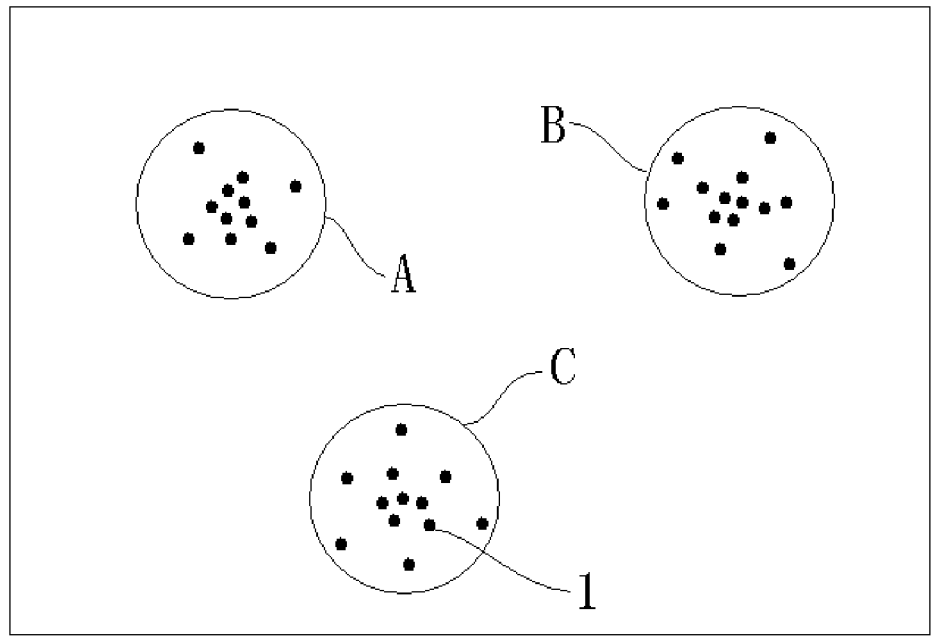
FIG. 5 is a schematic diagram of a plurality of geographic areas where corresponding IP addresses present due to IP drift described in the embodiments of the present application.

According to the drift rule of dynamic IP addresses of China's domestic network operators, as shown in FIG. 5, a geographic location 1 (indicated by black dots in the figure) of a dynamic IP address in the map must be repeated in a number of fixed geographic areas. In the map, the geographic area where the dynamic IP addresses densely present is the above geographic area. The geographic area must include the geographic location where a plurality of dynamic IP present. For example, in FIG. 5, an IP address always drifts in three geographic areas: A, B, and C.

Based on the foregoing rules, in the embodiment of the present application, after a target IP address of a target terminal device is obtained, a plurality of geographic areas where the target IP address presents can be determined based on the database, wherein, any geographic area is determined by a plurality of geographic locations where the target IP address presents.

Specifically, in the first implementation manner, determining, based on the database, a plurality of geographic areas where the target IP address presents may include:

determining a plurality of geographic locations where the target IP address presents based on the database;

obtaining a plurality of geographic areas where the target IP address presents based on the determined geographic locations.

In the first implementation manner, the default is that the database collects a correspondence between an IP address and a geographic location where the IP address presents. So when the server calls the data information in the database (that is, the information about the IP address and the geographic location), it is also necessary to count a plurality of geographic areas that divide all geographic locations corresponding to the IP address.

It can be understood that the existing technology can be employed to obtain a plurality of geographic areas where the target IP address presents based on the determined geographic locations. For example, a circular region may be constructed with a certain target geographic location as a center and a predetermined distance as a radius. If the number of target geographic locations in the circular area is higher than a predetermined threshold, the circular area is used as a geographic area where the target IP address presents, and other target geographic locations outside the circular area is processed in the same manner.

In addition, in the second implementation manner, in order to improve the search efficiency, the database further includes a correspondence between an IP address and a geographic location where the IP address presents. That is, the database has recorded a correspondence between an IP address and a plurality of geographic locations where the IP address presents, wherein, any geographic area is determined by a plurality of geographic locations where the target IP address presents.

Thus, determining, based on the database, a plurality of geographic areas where the target IP address presents may include:

obtaining a plurality of geographic areas where the target IP address presents based on the correspondence between an IP address and a geographic location where the IP address presents included in the database.

Moreover, it should be noted that when the database is built, the specific implementation manner of determining the geographic area where the IP address presents based on the geographic location corresponding to the IP address can adopt the existing technology, which is not limited herein.

S103: determining at least one piece of real-time data corresponding to the target IP address from the database, wherein the real-time data includes a target geographic location where the target IP address presents within a predetermined period;

The purpose of determining the real-time data is to find the positioning information reported by one or more terminal devices. The positioning information is reported by the terminal device after the corresponding target IP address drifts to the geographic area where the target terminal device is located. Therefore, the specific time period for the above-mentioned predetermined period should be as short as possible, and at the same time, it should be ensured that there is real-time data, for example, data within 1 hour can be selected.

Of course, after a predetermined period is preset, the situation that the real-time data that meets the condition cannot be found in the database is not excluded, and at this time, the server can determine that the above-mentioned a plurality of geographic areas are the possible geographic locations of the target terminal device.

S104: determining a target geographic area currently corresponding to the target IP address from the plurality of geographic areas based on the target geographic location included in the real-time data;

After obtaining at least one piece of real-time data from the database, in order to determine the precise position of the target terminal device, a target geographic area currently corresponding to the target IP address may be determined from the plurality of geographic areas based on the target geographic location included in the real-time data.

Specifically, determining a target geographic area currently corresponding to the target IP address from the plurality of geographic areas based on the target geographic location included in the real-time data may include:

determining, from the plurality of geographic areas, a geographic area covering a target geographic location included in the real-time data;

The determined geographic area is the target geographic area currently corresponding to the target IP address.

It should be noted here that when a plurality of target geographic locations in real-time data within a predetermined period are found in the above-mentioned different geographic areas, it indicates that the target IP address has drifted within the above-mentioned predetermined period. In this case, a geographic area in which a group of real-time data in the same geographic area closest to the query target IP address is located should be selected as the target geographic area.

S105: determining location information corresponding to the target terminal device based on the target geographic area.

The scope of the target geographic areas is relatively large, so the area scope needs to be reduced as much as possible. Specifically, determining location information corresponding to the target terminal device based on the target geographic area may include:

determining, from the target geographic areas, a first location area as the geographic location corresponding to the target terminal device, and determining the location information of the first location area as the location information corresponding to the target terminal device;

wherein, the first location area is a circular area with a specific radius in the map, and the number of geographic locations where the target IP address presents in a circular area of the same radius arbitrarily defined from the target geographic area, is less than the number of geographic locations where the target IP address presents in the first location area.

Figure 6:
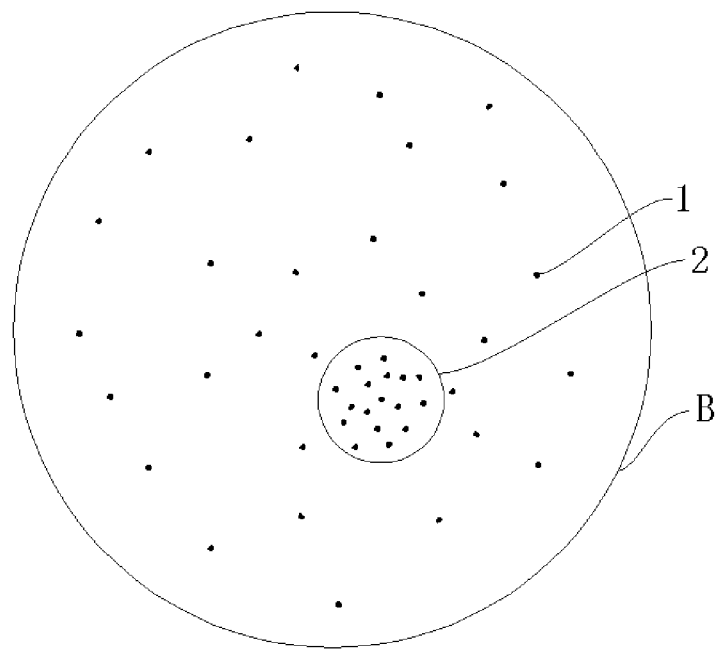
FIG. 6 is a schematic diagram of determining location information corresponding to the target terminal device based on the target geographic area according to an embodiment of the present application.

As shown in FIG. 5 and FIG. 6, assuming that the geographic area B in FIG. 5 is determined as a target geographic area, then a first location area 2 should be selected from the geographic area B. In the map, the first location area 2 is a circular area of a specific radius. Here, the specific radius can be set in advance. The specific radius characterizes the accuracy of the geographic location from which the target IP address was finally derived, so the specific radius may preferably be 10 to 200 meters.

It can be seen from FIG. 6, the number of geographic locations where the IP address presents in a circular area of the same radius arbitrarily defined from the target geographic area, is less than the number of geographic locations where the target IP address presents in the first location area 2.

In the computer algorithm, after the specific radius is set, a circular area with a preset ratio of geographic locations is selected as the first location area 2.

The above preset ratio is the ratio of the number of geographic locations where the target IP address in the first location area 2, to the number of geographic locations where the target IP address presents in the target geographic area.

In the above method, the query is mainly for the geographic location information of the dynamic IP address. Then for the static IP address, the geographic location corresponding to the IP address is fixed. In fact, in the network operator's database, the exact geographic location corresponding to the static IP address is stored, so the server terminal can obtain the exact geographic location corresponding to the static IP address from the network operator. When it is necessary to obtain a geographic location corresponding to a terminal device configured with a static IP address, the exact geographic location corresponding to the static IP address in the database is directly determined as the geographic location of the terminal device.

It should be emphasized here that even if the exact geographic location corresponding to the static IP address is not obtained from the network operator by the database of the server in the embodiment of the present application, the query of the geographic location corresponding to the static IP address may also be based on the method provided by the embodiments of the present application. The only difference is that steps S102~S104 can be directly simplified as: determining, based on the database, a target geographic area where the target IP address presents, wherein the target geographic area is determined by a plurality of geographic locations where the target IP address. Because a static IP address does not drift, there is only one geographic area where the static IP addresses should present.

The method for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

In order to more clearly understand the foregoing method for geographic location positioning, the method for geographic location positioning provided in the embodiment of the present application is described in detail from another perspective:

the execution subject of the method for geographic location positioning provided in the embodiment of the present application may be a server. It should be noted that, the server pre-stores a database including at least a correspondence between an IP address and a geographic location, wherein the geographic location corresponding to the IP address is obtained from a plurality of terminal devices configured with a positioning module by themselves, the process of the method for geographic location positioning provided in the embodiment of the present application may include the following steps:

obtaining a target IP address of a target terminal device;

determining a plurality of geographic areas corresponding to the target IP address based on the database, wherein, any geographic area is determined by a plurality of geographic locations corresponding to the target IP address;

obtaining at least one piece of real-time data corresponding to the target IP address from the database, wherein the real-time data includes a target geographic location corresponding to the target IP address;

determining a target geographic area currently corresponding to the target IP address from the plurality of geographic areas based on the target geographic location;

determining location information corresponding to the target terminal device based on the target geographic area.

It should be noted that a plurality of geographic areas corresponding to the target IP address are a plurality of geographic areas where the target IP address presents.

As there are many ways of determining a plurality of geographic areas corresponding to the target IP address based on the database, the following describes in detail:

In a first implementation manner, determining a plurality of geographic areas corresponding to the target IP address based on the database may include:

determining a plurality of geographic locations corresponding to the target IP address based on the database;

obtaining a plurality of geographic areas corresponding to the target IP address based on the determined geographic locations.

In a second implementation manner, a correspondence between an IP address and a geographic area is also stored in the database;

determining a plurality of geographic locations corresponding to the target IP address based on the database may include;

obtaining a plurality of geographic areas corresponding to the target IP address based on the correspondence between an IP address and a geographic location included in the database.

Specifically, determining location information corresponding to the target terminal device based on the target geographic area may include:

determining a first location area corresponding to the target terminal device from the target geographic area;

determining location information of the first location area as location information corresponding to the target terminal device;

wherein, the first location area is a circular area with a specific radius in the target geographic area, and the number of geographic locations corresponding to the target IP address in the first location area is greater than the number of geographic locations corresponding to the target IP address in the second location area. The second location area is any circular area having the same radius as the first location area in the target geographic area.

The method for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

Figure 2:
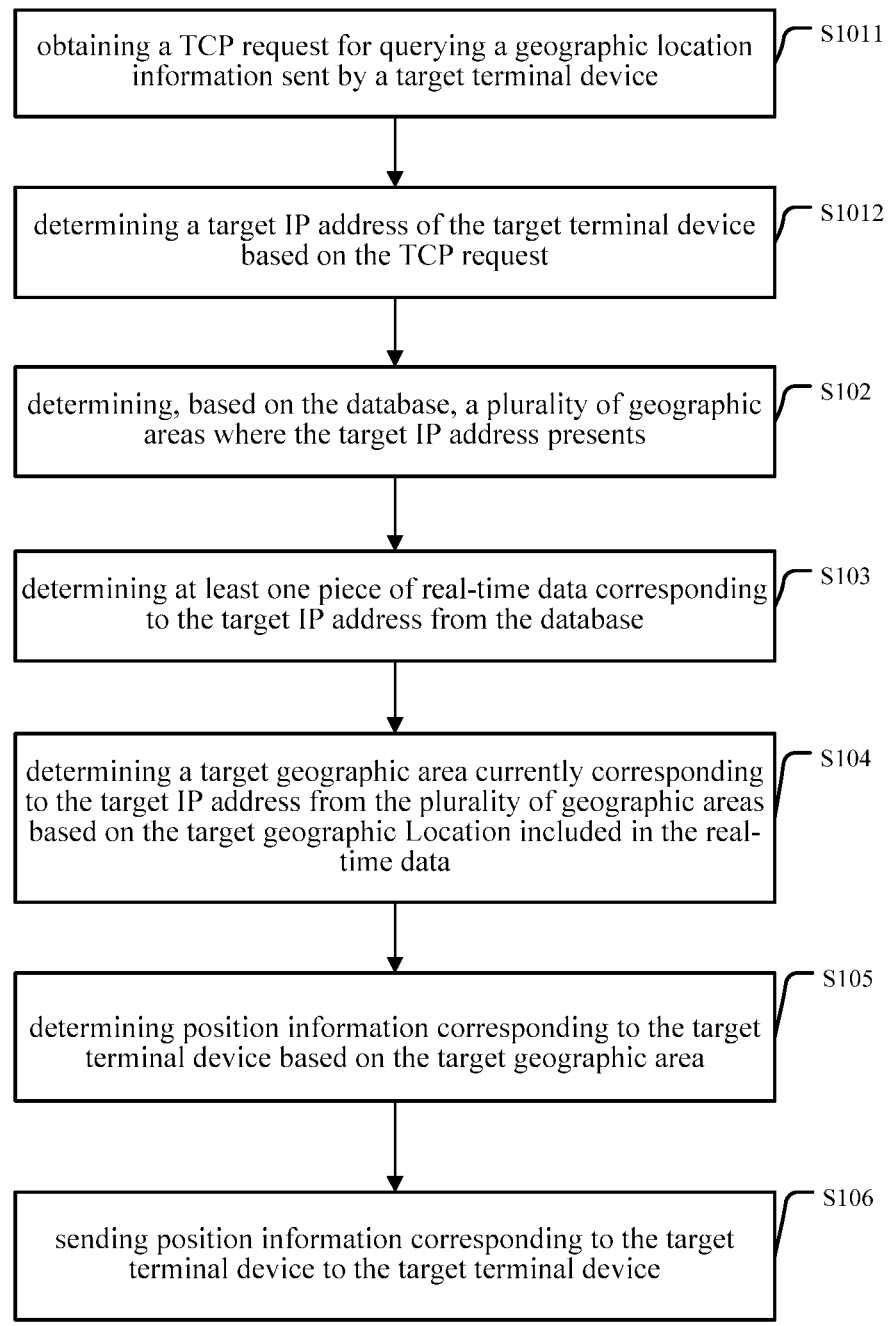
FIG. 2 is another flowchart of a method for geographic location positioning according to an embodiment of the present application.

Further, with respect to the process of the embodiment shown in FIG. 1, in another process of the method for geographic location positioning provided in the embodiment of the present application shown in FIG. 2, obtaining the target IP address of the target terminal device (S101) may include:

S1011: obtaining a TCP request for querying geographic location information sent by a target terminal device;

S1012: determining a target IP address of the target terminal device based on the TCP request.

This shows that the embodiment of the present application can also be applied to a technology in which a certain target terminal device actively queries its positioning information. When the target terminal device needs to query its geographic location, it may send a TCP request to the server requesting to query its geographic location. When the server receives the TCP request, it also acquires the target IP address of the target terminal device.

That is, the server obtains the TCP request for querying the geographic location information sent by the target terminal device, and determines the target IP address of the target terminal device based on the TCP request.

Wherein, the specific implementation manner of determining the target IP address of the target terminal device based on the TCP request may use any one of the existing technologies, which is not limited herein. Wherein the TCP request is a Transmission Control Protocol request.

In addition, with respect to the process of the embodiment shown in FIG. 1, the process shown in FIG. 2 further includes step S106: sending location information corresponding to the target terminal device to the target terminal device. Obviously, for the request of the target terminal device, after determining the location information corresponding to the target terminal device, the corresponding location information needs to be sent to the target terminal device. That is, the target terminal device is informed of the positioning information of its geographic location.

Figure 3:
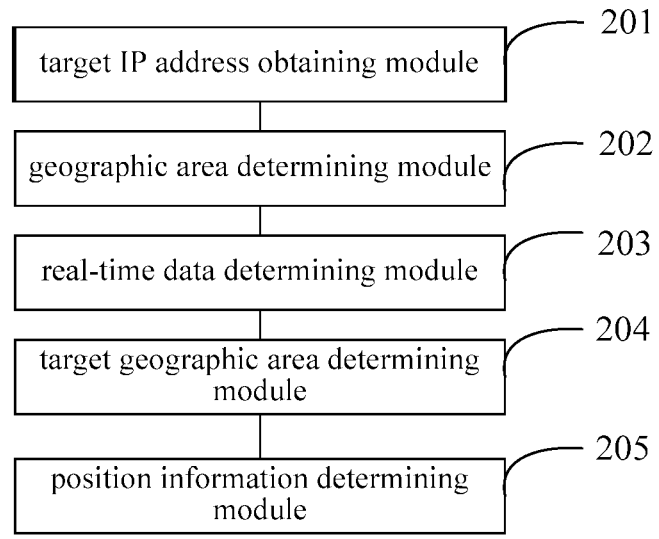
FIG. 3 is a schematic structural diagram of an apparatus for geographic location positioning according to an embodiment of the present application.

Corresponding to the above method embodiment of FIG. 1, an embodiment of the present application further provides an apparatus for geographic location positioning, which is applicable in a server, the server pre-stores a database including at least a correspondence between an IP address and a geographic location where the IP address presents, wherein the geographic location where the IP address presents is obtained from a plurality of terminal devices configured with a positioning module by themselves;

As shown in FIG. 3, an apparatus for geographic location positioning according to an embodiment of the present application may include:

a target IP address obtaining module 201, configured for obtaining a target IP address of a target terminal device;

a geographic area determining module 202, configured for determining a plurality of geographic areas where the target IP address presents based on the database, wherein, any geographic area is determined by a plurality of geographic locations where the target IP address presents;

as a first implementation manner, the geographic area determining module 202 includes:

a geographic location determining unit, configured for determining a plurality of geographic locations where the target IP address presents from the database;

a first geographic area determining unit, configured for obtaining a plurality of geographic areas where the target IP address presents based on the determined geographic locations.

Determining a plurality of geographic locations where the target IP address presents from the database; obtaining a plurality of geographic areas where the target IP address presents based on the determined geographic locations.

As a second implementation manner, the database further includes a correspondence between an IP address and a geographic location where the IP address presents, wherein, any geographic area is determined by a plurality of geographic locations where the target IP address presents;

thus, the geographic area determining module 202 may include:

a second geographic area determining unit, configured for obtaining a plurality of geographic areas where the target IP address presents based on the correspondence between an IP address and a geographic location included in the database.

a real-time data determining module 203, configured for determining at least one piece of real-time data corresponding to the target IP address from the database, wherein the real-time data includes a target geographic location where the target IP address presents within a predetermined period;

a target geographic area determining module 204, configured for determining a target geographic area currently corresponding to the target IP address from the plurality of geographic areas based on the target geographic location included in the real-time data;

the target geographic area determining module 204 may include:

a geographic area processing unit, configured for determining, from the plurality of geographic areas, a geographic area covering a target geographic location included in the real-time data;

a target geographic area determining unit, configured for taking the determined geographic area as the target geographic area currently corresponding to the target IP address.

The location information determining module 205 may include:

a first determining unit, configured for determining, from the target geographic areas, a first location area as a geographic location corresponding to the target terminal device;

a second determining unit, configured for determining location information of the first location area as geographic location information corresponding to the target terminal device;

wherein, the first location area is a circular area with a specific radius in the map, and the number of geographic locations where the target IP address presents in a circular area of the same radius arbitrarily defined from the target geographic area, is less than the number of geographic locations where the target IP address presents in the first location area.

Figure 4:
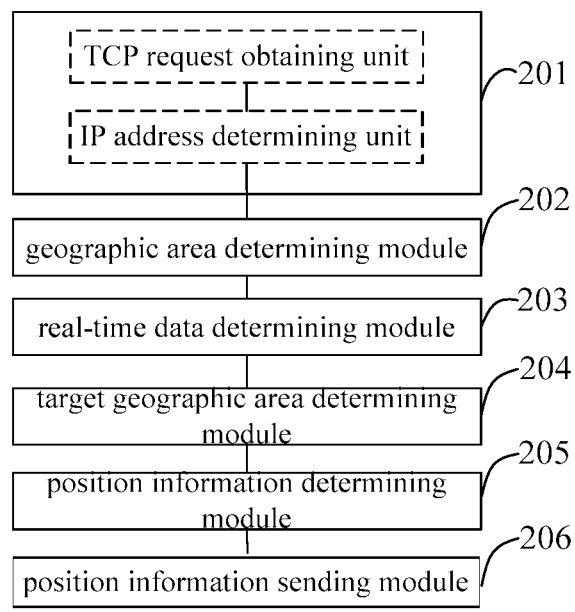
FIG. 4 is another schematic structural diagram of an apparatus for geographic location positioning according to an embodiment of the present application.

Further, based on the structure of the apparatus in the embodiment shown in FIG. 3, in another structure of the apparatus for geographic location positioning provided in the embodiment of the present application shown in FIG. 4, the target IP address obtaining module 201 may include:

a TCP request obtaining unit, configured for obtaining a TCP request sent by a target terminal device for querying a geographic location information;

an IP address determining unit, configured for determining a target IP address of the target terminal device based on the TCP request.

In addition, the structure shown in FIG. 4 further includes a location information sending module 206 for sending location information corresponding to the target terminal device to the target terminal device. Obviously, for the request of the target terminal device, after the location information corresponding to the target terminal device is determined, the corresponding location information needs to be sent to the target terminal device.

The apparatus for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

In order to more clearly understand the foregoing apparatus for geographic location positioning, the method for geographic location positioning provided in the embodiment of the present application is described in detail from another perspective:

An embodiment of the present application further provides an apparatus for geographic location positioning, which is applicable in a server, the server pre-stores a database including at least a correspondence between an IP address and a geographic location, wherein the geographic location corresponding to the IP address is obtained from a plurality of terminal devices configured with a positioning module by themselves;

The embodiment of the present application provides an apparatus for geographic location positioning, which is applicable in a server, the apparatus may include:

a target IP address obtaining module, configured for obtaining a target IP address of a target terminal device;

a geographic area determining module, configured for determining a plurality of geographic areas corresponding to the target IP address based on the database, wherein, any geographic area is determined by a plurality of geographic locations corresponding to the target IP address;

a real-time data determining module, configured for obtaining at least one piece of real-time data corresponding to the target IP address from the database, wherein the real-time data includes a target geographic location corresponding to the target IP address;

a target geographic area determining module, configured for determining a target geographic area currently corresponding to the target IP address from the plurality of geographic areas based on the target geographic location;

a location information determining module, configured for determining location information corresponding to the target terminal device based on the target geographic area.

In the first implementation manner, the geographic area determining module may include:

a geographic location determining unit, configured for determining a plurality of geographic locations corresponding to the target IP address from the database;

a first geographic area determining unit, configured for obtaining a plurality of geographic areas corresponding to the target IP address based on the determined plurality of geographic locations.

In a second implementation manner, a correspondence between an IP address and a geographic area is stored in the database.

The geographic area determining module may include:

a second geographic area determining unit, configured for obtaining a plurality of geographic areas corresponding to the target IP address based on the correspondence between an IP address and a geographic area included in the database.

Specifically, the target geographic area determining module may include:

a geographic area processing unit, configured for determining, from the plurality of geographic areas, a geographic area covering the target geographic location;

a target geographic area determining unit, configured for taking the determined geographic area as the target geographic area currently corresponding to the target IP address.

Specifically, the location information determining module may include:

a first determining unit, configured for determining, from the target geographic areas, a first location area corresponding to the target terminal device;

a second determining unit, configured for determining location information of the first location area as location information corresponding to the target terminal device;

wherein, the first location area is a circular area with a specific radius in the target geographic area, and the number of geographic locations corresponding to the target IP address in the first location area is greater than the number of geographic locations corresponding to the target IP address in the second location area. The second location area is any circular area having the same radius as the first location area in the target geographic area.

Specifically, the target IP address obtaining module includes:

a TCP request obtaining unit, configured for obtaining a TCP request sent by a target terminal device for querying a geographic location information;

an IP address determining unit, configured for determining a target IP address of the target terminal device based on the TCP request.

The apparatus for geographic location positioning provided in the embodiment of the present application may further include:

a location information sending module, configured for sending location information corresponding to the target terminal device to the target terminal device.

The apparatus for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

An embodiment of the present application further provides an electronic device, comprising: a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components of the electronic device; the memory is configured to store an executable program code; the processor executes the program corresponding to the executable program code by reading the executable program code stored in the memory for performing the method for geographic location positioning provided in the embodiment of the present application, wherein the method for geographic location positioning may include:

obtaining a target IP address of a target terminal device;

determining a plurality of geographic areas corresponding to the target IP address based on the database, wherein, any geographic area is determined by a plurality of geographic locations corresponding to the target IP address;

obtaining at least one piece of real-time data corresponding to the target IP address from the database, wherein the real-time data includes a target geographic location corresponding to the target IP address;

determining a target geographic area currently corresponding to the target IP address from the plurality of geographic areas based on the target geographic location;

determining location information corresponding to the target terminal device based on the target geographic area.

The method for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

An embodiment of the present application provides an application program, the application program is used to perform the method for geographic location positioning provided in the embodiment of the present application when being executed. Wherein the method for geographic location positioning may include:

obtaining a target IP address of a target terminal device;

determining a plurality of geographic areas corresponding to the target IP address based on the database, wherein, any geographic area is determined by a plurality of geographic locations corresponding to the target IP address;

obtaining at least one piece of real-time data corresponding to the target IP address from the database, wherein the real-time data includes a target geographic location corresponding to the target IP address;

determining a target geographic area currently corresponding to the target IP address from the plurality of geographic areas based on the target geographic location;

determining location information corresponding to the target terminal device based on the target geographic area.

The method for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

An embodiment of the present application provides a storage medium, wherein the storage medium is used to store executable program code, and the executable program code is used to perform the method for geographic location positioning provided in the embodiment of the present application when being executed. Wherein the method for geographic location positioning may include:

obtaining a target IP address of a target terminal device;

determining a plurality of geographic areas corresponding to the target IP address based on the database, wherein, any geographic area is determined by a plurality of geographic locations corresponding to the target IP address;

obtaining at least one piece of real-time data corresponding to the target IP address from the database, wherein the real-time data includes a target geographic location corresponding to the target IP address;

determining a target geographic area currently corresponding to the target IP address from the plurality of geographic areas based on the target geographic location;

determining location information corresponding to the target terminal device based on the target geographic area.

The method for geographic location positioning provided in the embodiments of the present application, by means of determining location information of a target terminal device by using geographic locations of a plurality of terminal devices in big data, without depending on a positioning module of the target terminal device itself; in addition, the geographic location of the terminal device in the big data is determined by a positioning module set by the terminal device itself and has a high degree of accuracy, and the positioning of the target terminal device relies on the geographic location of the above terminal device. Therefore, the determined location information of the target terminal device has high accuracy. It can be seen, it can accurately locate a terminal device without depending on a positioning module of the terminal device itself by means of the technical solution.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

The embodiments in the specification are all described in related manners, and the same or similar parts among the embodiments may refer to each other, and each embodiment focuses on the difference from other embodiments. For the embodiments of the apparatus, the electronic device, the storage medium and the application program, since they are basically similar to the method embodiments, the description is relatively simple. For related parts, reference may be made to the partial description of the method embodiments.

It will be understood by those of ordinary skill in the art that all or some of the steps in the method described above may be accomplished by a program to instruct the associated hardware. Said program may be stored in a computer-readable storage medium, such as ROM/RAM, magnetic disks, optical disks, etc.

The above description is only the preferred embodiments of the present application and is not intended to limit the protection scope of the present application. Any amendments, equivalent substitutions, improvements etc. made within the spirit and principle of the present application are all included in the protection scope of the present application.

What is claimed is:

1. A method for geographic location positioning, which is applicable in a server, comprising:
    obtaining a target IP address of a target terminal device;
    determining a plurality of geographic areas corresponding to the target IP address;
    obtaining at least one piece of real-time data corresponding to the target IP address, wherein the real-time data includes a target geographic location corresponding to the target IP address;
    determining a target geographic area currently corresponding to the target IP address from the plurality of geographic areas based on the target geographic location; and
    determining location information corresponding to the target terminal device based on the target geographic area,
    wherein, determining location information corresponding to the target terminal device based on the target geographic area, comprises:
    determining a first location area corresponding to the target terminal device from the target geographic area; and
    determining location information of the first location area as location information corresponding to the target terminal device;
    wherein, the first location area is a circular area with a specific radius in the target geographic area, and the number of geographic locations corresponding to the target IP address in the first location area is greater than the number of geographic locations corresponding to the target IP address in the second location area, and the second location area is any circular area with the same radius as the first location area in the target geographic area.

2. The method of claim 1, wherein, obtaining a target IP address of a target terminal device comprises:
    obtaining a TCP request for querying geographic location information sent by the target terminal device, and determining a target IP address of the target terminal device based on the TCP request.

3. The method of claim 2, further comprising:
    sending location information corresponding to the target terminal device to the target terminal device.

4. The method of claim 1, wherein, determining a plurality of geographic areas corresponding to the target IP address comprises:
    determining a plurality of geographic locations corresponding to the target IP address, wherein a correspondence between an IP address and a geographic location is stored in the server; and
    obtaining a plurality of geographic areas corresponding to the target IP address based on the determined plurality of geographic locations.

5. The method of claim 1, wherein a correspondence between an IP address and a geographic area is stored in the server;
    determining a plurality of geographic areas corresponding to the target IP address comprises:
    obtaining a plurality of geographic areas corresponding to the target IP address based on the correspondence between an IP address and a geographic area.

6. The method of claim 1, wherein, determining a target geographic area currently corresponding to the target IP address from the plurality of geographic areas based on the target geographic location, comprises:
    determining, from the plurality of geographic areas, a geographic area covering the target geographic location;
    taking the determined geographic area as the target geographic area currently corresponding to the target IP address.

7. An electronic device, comprising: a housing, a processor, a memory, a circuit board, and a power supply circuit; wherein the circuit board is arranged inside a space enclosed by the housing; the processor and the memory are arranged on the circuit board; the power supply circuit is configured to supply power to various circuits or components; the memory is configured to store executable program codes; the processor executes the executable program codes by reading the executable program codes stored in the memory for performing the method for geographic location positioning of claim 1.

8. A storage medium, wherein the storage medium is used to store executable program codes, and the executable program codes are used to perform the method for geographic location positioning of claim 1 when being executed.

9. An apparatus for geographic location positioning, which is applicable in a server, comprising:
 a target IP address obtaining module, configured for obtaining a target IP address of a target terminal device;
 a geographic area determining module, configured for determining a plurality of geographic areas corresponding to the target IP address;
 a real-time data determining module, configured for obtaining at least one piece of real-time data corresponding to the target IP address, wherein the real-time data includes a target geographic location corresponding to the target IP address;
 a target geographic area determining module, configured for determining a target geographic area currently corresponding to the target IP address from the plurality of geographic areas based on the target geographic location; and
 a location information determining module, configured for determining location information corresponding to the target terminal device based on the target geographic area,
 wherein, the location information determining module comprises:
 a first determining unit, configured for determining a first location area corresponding to the target terminal device from the target geographic area; and
 a second determining unit, configured for determining location information of the first location area as location information corresponding to the target terminal device;
 wherein, the first location area is a circular area with a specific radius in the target geographic area, and the number of geographic locations corresponding to the target IP address in the first location area is greater than the number of geographic locations corresponding to the target IP address in the second location area, and the second location area is any circular area with the same radius as the first location area in the target geographic area.

10. The apparatus of claim 9, wherein, the target IP address obtaining module comprises:
 a TCP request obtaining unit, configured for obtaining a TCP request for querying geographic location information sent by the target terminal device; and
 an IP address determining unit, configured for determining a target IP address of the target terminal device based on the TCP request.

11. The apparatus of claim 10, wherein, the apparatus further comprises:
 a location information sending module, configured for sending location information corresponding to the target terminal device to the target terminal device.

12. The apparatus of claim 9, wherein, the geographic area determining module comprises:
 a geographic location determining unit, configured for determining a plurality of geographic locations corresponding to the target IP address, wherein a correspondence between an IP address and a geographic location is stored in the server; and
 a first geographic area determining unit, configured for obtaining a plurality of geographic areas corresponding to the target IP address based on the determined plurality of geographic locations.

13. The apparatus of claim 9, wherein a correspondence between an IP address and a geographic area is stored in the server;
 the geographic area determining module comprises:
 a second geographic area determining unit, configured for obtaining a plurality of geographic areas corresponding to the target IP address based on the correspondence between an IP address and a geographic area.

14. The apparatus of claim 9, wherein, the target geographic area determining module comprises:
 a geographic area processing unit, configured for determining, from the plurality of geographic areas, a geographic area covering the target geographic location;
 a target geographic area determining unit, configured for taking the determined geographic area as the target geographic area currently corresponding to the target IP address.

* * * * *